(12) United States Patent
Englert

(10) Patent No.: US 10,267,582 B2
(45) Date of Patent: Apr. 23, 2019

(54) APPARATUS FOR MEASURING THE TEMPERATURE OF CHAMBERED PROJECTILE

(71) Applicant: The United States of America as represented by the Secretary of the Navy, Crane, IN (US)

(72) Inventor: Stefan L. Englert, Temecula, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 648 days.

(21) Appl. No.: 14/676,793

(22) Filed: Apr. 1, 2015

(65) Prior Publication Data

US 2015/0316420 A1    Nov. 5, 2015

Related U.S. Application Data

(60) Provisional application No. 61/973,313, filed on Apr. 1, 2014.

(51) Int. Cl.
| | | |
|---|---|---|
| *F41A 13/00* | (2006.01) |
| *G01K 7/02* | (2006.01) |
| *F42B 8/08* | (2006.01) |
| *F41A 31/00* | (2006.01) |
| *F42B 5/24* | (2006.01) |
| *F42B 8/02* | (2006.01) |
| *G01K 1/02* | (2006.01) |
| *F42B 12/36* | (2006.01) |

(52) U.S. Cl.
CPC .............. *F41A 13/00* (2013.01); *F41A 31/00* (2013.01); *F42B 5/24* (2013.01); *F42B 8/02* (2013.01); *F42B 8/08* (2013.01); *G01K 1/026* (2013.01); *G01K 7/02* (2013.01); *F42B 12/365* (2013.01); *Y10T 29/49119* (2015.01)

(58) Field of Classification Search
CPC .. F41A 13/00; F41A 31/00; F42B 5/24; F42B 8/02; F42B 8/08; F42B 12/365; G01K 1/026; G01K 7/02; Y10T 29/49119
See application file for complete search history.

(56) References Cited

U.S. PATENT DOCUMENTS 2,829,185 A    4/1958    Macatician et al.
2,939,318 A    6/1960    Armi et al.
(Continued)

OTHER PUBLICATIONS

*Pressure Factors: How Temperature, Powder, and Primer Affect Pressure*, Denton Bramwell, denton@pmg.cc, Copyright 2003; 9 pgs.

(Continued)

*Primary Examiner* — Lisa Caputo
*Assistant Examiner* — Philip Cotey
(74) *Attorney, Agent, or Firm* — Christopher A. Monsey

(57) ABSTRACT

A system, device, and method for measuring the temperature of a chambered projectile within a firearm are provided. A test ammunition round may include a projectile, a sleeve, and a case including a first end coupled to sleeve, and a second end coupled to the projectile. A thermocouple may be located within the projectile, and an electronic coupler may be coupled to the thermocouple, and extends through the case and the sleeve and exits the sleeve through a slot for coupling to a data acquisition system.

17 Claims, 14 Drawing Sheets

(56) References Cited

U.S. PATENT DOCUMENTS

| | | | | |
|---|---|---|---|---|
| 3,902,353 A * | 9/1975 | San Miguel | ............ | F42B 35/00 |
| | | | | 374/46 |
| 3,921,499 A | 11/1975 | Ginsky | | |
| 5,624,189 A | 4/1997 | Vottis et al. | | |
| 5,659,148 A | 8/1997 | Isgen | | |
| 7,581,497 B2 * | 9/2009 | Rabin | .................... | F41A 31/00 |
| | | | | 102/293 |
| 8,009,060 B2 * | 8/2011 | Kramer | ................... | F42B 39/14 |
| | | | | 340/870.16 |
| 8,738,330 B1 | 5/2014 | DiMartino et al. | | |
| 2001/0002918 A1 * | 6/2001 | Tatoh | .................... | G01K 1/143 |
| | | | | 374/179 |
| 2003/0058130 A1 * | 3/2003 | Kramer | ................... | F42B 39/14 |
| | | | | 340/870.07 |
| 2003/0142721 A1 * | 7/2003 | Hammer | ................ | G01K 17/20 |
| | | | | 374/29 |
| 2006/0207464 A1 * | 9/2006 | Maljkovic | ............... | C08L 65/02 |
| | | | | 102/466 |
| 2007/0067138 A1 * | 3/2007 | Rabin | .................... | F41A 31/00 |
| | | | | 702/150 |
| 2013/0126612 A1 * | 5/2013 | Durkee | ................... | F42B 15/01 |
| | | | | 235/400 |
| 2014/0196300 A1 | 7/2014 | Williamson | | |

OTHER PUBLICATIONS

Maximum Cartridge/Minimum Chamber—223 Remington; Sporting Arms and Ammunition Manufacturers' Institute, Inc. ("SAAMI"); retrieved from http://www.saami.org/PubResources/CC_Drawings/Rifle/223%20Remington.pdf; Mar. 18, 2014; 1 pg.

* cited by examiner

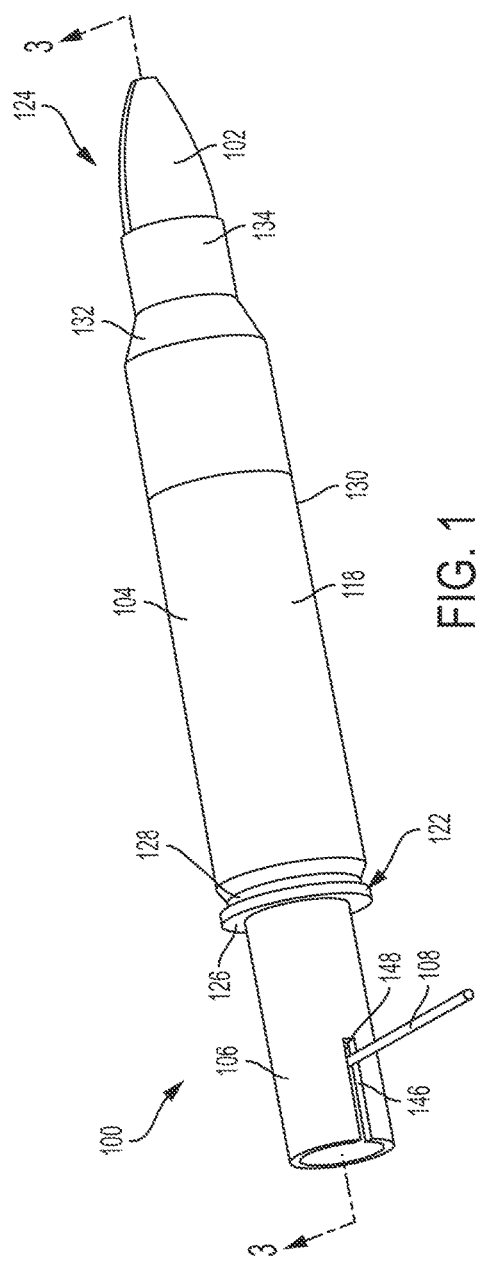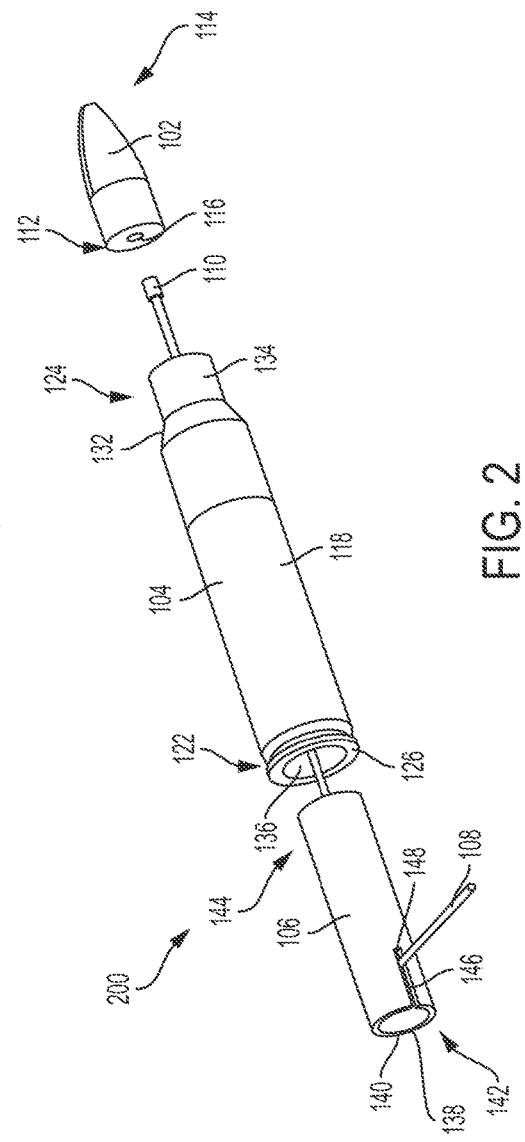

APPARATUS FOR MEASURING THE TEMPERATURE OF CHAMBERED PROJECTILE

CROSS-REFERENCE TO RELATED APPLICATION

This applications claims priority to U.S. Provisional Patent Application Ser. No. 61/973,313, filed Apr. 1, 2014, the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (NC 103,207) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND

Firearms are complex devices that require precisely machined components and ammunition to function properly. It is advantageous to know the various loads, temperatures, and pressures that a firearm might experience during operation in order to design components that can withstand the physical environment to which they will be exposed. One way to understand the type of physical environment to which a particular component is going to be exposed, is by directly measuring the properties of the area of interest on a functioning firearm. This can be achieved by using any of a plurality of available sensors to measure various environmental conditions. Such sensors may include, for example, thermocouples, strain gauges, pressure sensors, and the like.

With regard to firearms, it may be advantageous to understand the types of temperatures a chambered round of ammunition may experience. In firearms capable of quickly firing successive rounds of ammunition, the chamber may become very hot. Further, the material properties of the projectile may be such that, if it is exposed to extreme temperatures, it may partially deform. Prolonged exposure to extreme chamber temperatures may cause a projectile to deform sufficiently to affect the function of the projectile. More specifically, the deformation could further result in inconsistent and/or inaccurate flight paths of the projectile. This may be particularly true with projectiles formed of alternative materials, such as copper polymer alloys. The precision and accuracy of a projectile are a crucial aspect of firearm and ammunition design. It is advantageous to thoroughly understand the temperatures of chambered projectiles to ensure that ammunition will not deform after the firing of successive rounds of ammunition.

SUMMARY OF THE DISCLOSURE

The present disclosure relates to a test ammunition round. More specifically, the test ammunition round may include a projectile having a first at least partial through hole. The test ammunition round may also include a sleeve that is substantially hollow and has a slot extending from a base portion to a terminus along the sleeve, a case that is substantially hollow and has a second at least partial through hole on a first end to receive the sleeve, and a third at least partial through hole on a second end that can receive the projectile. A thermocouple is illustratively located within the first at least partial through hole of the projectile, and an electronic coupler is coupled to the thermocouple and extends through the substantially hollow case and the substantially hollow sleeve, and exits the sleeve through the slot. Further, the exemplary test ammunition round may be inserted into a firing chamber of a firearm, where the thermocouple transmits temperature measurement readings through the electronic coupler to a data acquisition system.

According to an illustrative embodiment of the disclosure, an inert test ammunition round includes a projectile extending between a proximal end and a distal end, the projectile including a receiving cavity formed within the proximal end. A sleeve extends between a proximal end and a distal end, the sleeve including a cylindrical outer side wall defining an axially extending opening, and a radially extending slot formed within the proximal end of the sleeve. A hollow case extends between a proximal end and a distal end, the case including a case passageway extending from the proximal end to the distal end, the sleeve being coupled to the proximal end of the hollow case, and the projectile being coupled to the distal end of the sleeve. A thermocouple is received within the receiving cavity of the projectile. A thermally conductive fastener secures the thermocouple within the receiving cavity. A wire is coupled to the thermocouple and extends from the projectile, through the axially extending opening of the case, into the axially extending opening of the sleeve, and exits the sleeve radially through the slot. At least one of the projectile and the case is formed of a copper polymer alloy. The test ammunition round may be inserted into a firing chamber of a firearm wherein the thermocouple transmits temperature readings through the wire to a data acquisition system.

According to another illustrative embodiment of the present disclosure, a system for measuring the temperature of a chambered projectile in a firearm includes a stand, and a firearm supported by the stand, the firearm including a chamber configured to receive an ammunition round, and a barrel including a muzzle and a gas port. An inert test ammunition round is received within the chamber of the firearm. The test ammunition round includes a case, a projectile coupled to the case, and a projectile thermocouple thermally coupled to the projectile and having a wire extending from the projectile through the casing. A muzzle temperature sensor is thermally coupled to the muzzle at the exterior of the barrel of the firearm. A gas port temperature sensor is thermally coupled to the gas port at the exterior of the barrel of the firearm. A chamber temperature sensor is thermally coupled to the chamber at the exterior of the barrel of the firearm. A data acquisition system is in electrical communication with the projectile thermocouple, the muzzle temperature sensor, the gas port temperature sensor, and the chamber temperature sensor. The data acquisition system receives signals representative of temperatures from the projectile thermocouple, the muzzle temperature sensor, the gas port temperature sensor, and the chamber temperature sensor. A processor is in electrical communication with the data acquisition system and is configured to receive the temperature measurements from the projectile thermocouple, the muzzle temperature sensor, the gas port temperature sensor, and the chamber temperature sensor for a plurality of different ammunition round firing sequences for predicting the number of successive rounds of ammunition that may be fired before the firing chamber reaches a projectile deformation temperature.

According to a further illustrative embodiment of the present disclosure, a method of manufacturing a test ammunition round includes the steps of providing a projectile that is compatible with a firing chamber for a firearm under test, and boring a receiving cavity in a proximal end of the projectile. The method further includes the steps of providing a case that is compatible with the chamber of the firearm under test, the case including a case passageway extending from a proximal end to a distal end, and boring an enlarged case opening into the proximal end of the case. The method also includes the steps of providing a thermocouple and a lead wire electrically coupled to the thermocouple, one of brazing and soldering the thermocouple into the receiving cavity of the projectile, and running the lead wire from the thermocouple, through the case passageway of the case. The method further includes the steps of pressing the proximal end of the projectile into the distal end of the case, providing a sleeve including a cylindrical outer side wall defining an axially extending sleeve passageway, and forming a radially extending slot within the proximal end of the sleeve. The method also includes the steps of running the lead wire axially into the sleeve passageway and radially out through the slot in the sleeve, and pressing the distal end of the sleeve at least partially into the proximal end of the case.

According to another illustrative embodiment of the present disclosure, a method of measuring the temperature of a chambered projectile of a firearm using a test ammunition round is provided. The method includes the steps of providing a firearm including a firing chamber, instrumenting a test ammunition round projectile with a projectile thermocouple, and coupling the projectile thermocouple to a data acquisition system. The method further includes the steps of firing a first plurality of rounds of ammunition through the firearm under test to heat the firing chamber, inserting the test ammunition round into the firing chamber, recording a first temperature profile of the projectile thermocouple with the data acquisition system, and removing the test ammunition round from the firing chamber. The method also includes the steps of firing a second plurality of rounds of ammunition through the firearm under test to heat the firing chamber, the second plurality of rounds of ammunition being greater than the first plurality of rounds of ammunition, inserting the test ammunition round into the firing chamber, and recording a second temperature profile of the projectile through the projectile thermocouple with the data acquisition system.

According to a further illustrative embodiment of the present disclosure, a method of assessing a firearm includes the steps of providing a firearm having a firing chamber, instrumenting a test ammunition round with a projectile thermocouple, and coupling the projectile thermocouple to a data acquisition system. The method further includes the steps of firing a first plurality of rounds of ammunition through the firearm under test to heat the firing chamber to a first operating threshold temperature, inserting the test ammunition round into the firing chamber, measuring signals from the projectile thermocouple indicative of temperature of the test ammunition round within the firing chamber to determine the first operating threshold temperature, and removing the test ammunition round from the firing chamber. The method also includes the steps of firing a second plurality of rounds of ammunition through the firearm under test to heat the firing chamber to a second operating threshold temperature, inserting the test ammunition round into the firing chamber, and measuring signals from the projectile thermocouple indicative of temperature of the test ammunition round within the firing chamber to determine the second operating threshold temperature. The method further includes determining a deformation temperature resulting in a deformation defect of a projectile received within the firing chamber, determining a time during which the projectile can be exposed at the deformation temperature before the deformation defect occurs, and predicting which of the first plurality and the second plurality of rounds of ammunition that may be fired through the firearm before the deformation temperature is exceeded.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 1 is a perspective view of an illustrative test ammunition round with a thermocouple supported in a projectile;

FIG. 2 is an exploded perspective view of the test ammunition round of FIG. 1;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 3:
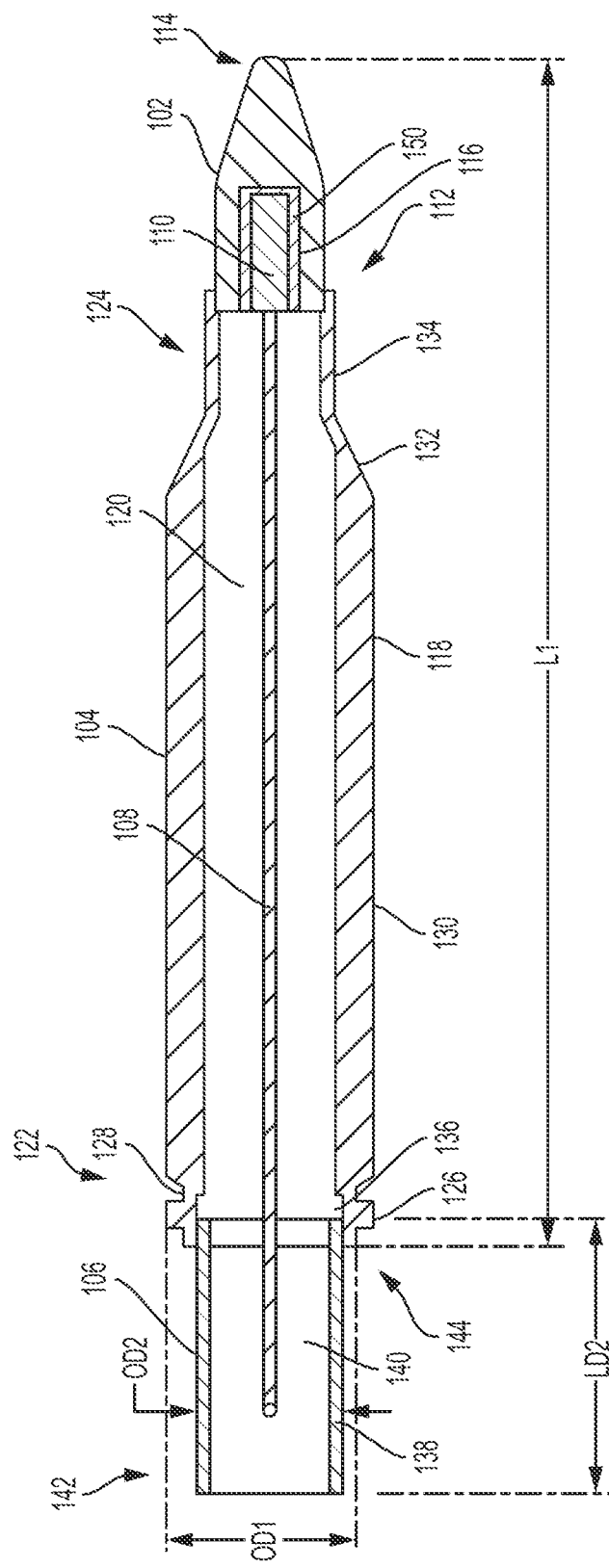
FIG. 3 is a cross-sectional view of the test ammunition round taken along line 3-3 of FIG. 1.

With reference initially to FIGS. 1-3, an illustrative embodiment test round, or cartridge, of ammunition 100 includes a projectile or bullet 102, a cartridge case 104, a sleeve 106, an electronic coupler 108, and a thermocouple 110. The projectile 102 extends from a proximal end 112 to a distal end 114 and may be formed of a solid metal, such as copper. In one illustrative embodiment, the projectile 102 is formed of a copper/polymer alloy, illustratively a copper powder/nylon binder composition. In another illustrative embodiment, the projectile 102 is a modified 62 gr Barnes TSX copper projectile. A receiving cavity 116 is formed in the proximal end 112 of the projectile 102 and is configured to receive the thermocouple 110.

The case 104 is illustratively hollow and includes a side wall 118 defining a case passageway 120 extending between a proximal end 122 and a distal end 124. The case 104 may be formed of metal, such as copper, or a metal alloy, such as a copper/polymer alloy. The case 104 includes a head 126, an extracting groove 128, a body 130, a shoulder 132 and a neck 134. An enlarged opening 136 is formed within the head 126 at the proximal end 122 of the case 104 for receiving a distal end 144 of the sleeve 106. The sleeve 106 may be formed of metal, such as steel or aluminum.

The projectile 102 and the case 104 can be a standard size and shape to correspond to a particular firearm 201 under test. For example, in one illustrative embodiment, the projectile 102 and the case 104 can be of similar dimensions to a round of ammunition for a 5.56 mm or .223 caliber rifle, such as an M16A2 rifle. Further, one skilled in the art can understand that the teachings of this disclosure can be similarly implemented for a plurality of different types of ammunition. The projectile 102 and the case 104 could be dimensioned to correlate to anything ranging from smaller than a .17 caliber handgun round to at least as big as a .950 caliber rifle round.

More particularly, the test round of ammunition 100 is configured to have substantially identical exterior dimensions as the standard projectile for the particular firearm 201 being tested, with the exception of the additional sleeve 106. As noted above, the test ammunition round 100 of the illustrative embodiment is configured to have dimensions substantially identical to a 5.56 mm or .223 caliber ammunition round (less the sleeve 106). Illustratively, the maximum outer diameter (OD1) of the case 104 is 0.394 inches (10 mm), and may be about 0.378 inches (9.6 mm). The maximum length (L1) of the case 104 and the projectile is illustratively 2.362 inches (60 mm), and may be about 2.26 inches (57.4 mm). The sleeve 106 illustratively protrudes axially from the proximal end 122 of the case 104. In an illustrative embodiment, the proximal end 122 of the case 104 includes enlarged partial through hole or opening 136 (FIGS. 2 and 3) that substantially correlates with an outer diameter of the sleeve 106. Further, the distal end 124 of the case 104 is configured to receive, and be removeably coupled to, the proximal end 114 of the projectile 102. The case 104 may be substantially hollow and allows the electronic coupler 108 to pass there through.

The projectile opening or receiving cavity 116 is shown in FIGS. 2 and 3 as extending axially within the proximal end 112 of the projectile 102. The projectile receiving cavity 116 is substantially sized to allow the thermocouple 110 to be disposed therein. In the illustrative embodiment, the receiving cavity 116 has a diameter of 0.063 inches (1.59 mm). The receiving cavity 116 may be a blind hole extending only partially through the projectile 102, or may be a thru hole extending through the distal end 114 of the projectile 102.

The case 104 may surround the electronic coupler 108 and partially house the sleeve 106. The electronic coupler 108 may transition out of the sleeve 106 through a partial slot 146 in the sleeve 106 that is sufficiently sized to allow the electronic coupler 108 to pass there through.

The electronic coupler 108 can be any common electronic conductor such as insulated copper wire defining a lead wire electrically coupled to the thermocouple 110. Further, the partial slot 146 may begin at a base portion 140 of the sleeve 106 at the proximal end 142, and end at a terminus 148 along the surface of the sleeve 106 short of the distal end 144. In one embodiment, the partial slot 146 may allow the wire 108 to exit the sleeve 106 by transitioning radially through the partial slot 146 on one side of the sleeve 106. By keeping the base portion 140 of the sleeve 106 unobstructed by the wire 108, a bolt 214 from a firearm 201 may contact the base portion 140 of the sleeve 106 to position the test round of ammunition 100 at least partially within a firing chamber 206. The sleeve 106 may extend sufficiently away from the proximal end 122 of the case 104 to keep the bolt 214 from pinching or contacting the wire 108.

In one illustrative embodiment, after the firing chamber has been heated by firing several live rounds of ammunition, a user may place the test round of ammunition 100 partially in the chamber of the firearm. The user may then allow the bolt 214 of the firearm 201 to contact the base portion 140 of the sleeve 106 to substantially position the test round of ammunition 100 into the chamber 206. Further, the wire 108 from the thermocouple 110 may radially exit the sleeve 106 through the partial slot 146 and be coupled to an external data acquisition system 230.

The thermocouple 110 may be of conventional design, and illustratively is a Type K, 30 AWG, exposed junction thermocouple of the type available from NANMAC Corporation of Holliston, Mass. The thermocouple 110 may be secured to the projectile 102 by a thermally conductive fastener 150. More particularly, the thermocouple 110 may be soldered or brazed into the receiving cavity 116 of the projectile 102 along a center axis of the projectile 102. The fastener 150 may be a filler used for brazing or soldering the thermocouple 202 to the projectile 102, which illustratively has substantially similar thermal properties as the projectile 102. Illustratively, the filler 150 is a silver solder, although other fillers may be substituted therefor, such as copper, copper-silver, nickel alloy or the like. The similar thermal properties between the filler 150 and the projectile 102 may ensure consistent and accurate transmission of the projectile's 102 surrounding thermal characteristics through the filler 150 to the thermocouple 110. The thermocouple 110 may be substantially retained within the projectile 102 by the filler 150 and further be coupled to the wire 108. When the projectile 102 is placed within the chamber 206 of the firearm 201, the projectile 102 may contact the surrounding chamber. The contact between the chamber 206 and the projectile 102 may heat the projectile 102 to the surrounding chamber temperature, which in turn heats the thermocouple 110.

In one illustrative embodiment, the thermocouple 110 may be coupled to the wire 108 before the thermocouple 110 is inserted into the projectile 102. The thermocouple 110 may then be brazed or soldered to the projectile 102 while located within the projectile receiving cavity 116. The wire 108 may run through the passageway 120 and 140 of the case 104. The projectile 102 may then be press fit into the second end 112 of the case 104 so that the case 104 and the projectile 102 are substantially the same length (L1) as the standard ammunition round for the firearm being tested. A conventional reloading press may be used to press fit the projectile 102 into the case 104, which may crimp the case 104 to releasably secure the projectile 102 therein.

Next, the wire 108 from the thermocouple 110 may be passed axially into the passageway 140 of the sleeve 106, and radially out through the slot 146 of the sleeve 106. The sleeve 106 may be aligned with opening 136 within the proximal end 122 of the case 104. The sleeve 106 may be pressed into the opening 136 within the case 104 so that the sleeve 106 is coupled to the case 104 through a friction or press fit. The slot 146 may be at open at the proximal end of the sleeve 106 from the case 104 to facilitate positioning of the wire 108 therein. In one illustrative embodiment, the sleeve 106 has an outer diameter (OD2) of about 0.375 inches (9.53 mm), and a length (LD2) of about 0.75 inches (19.05 mm). The slot 146 illustratively extends distally by approximately 0.25 inches (6.35 mm) from the proximal end 142 of the sleeve 106. The sleeve 106 may be of different dimensions as long as it provides a means for the electronic coupler 108 to exit the chamber of the firearm when placed therein, and this disclosure should not be limited to any one configuration.

Figure 4:
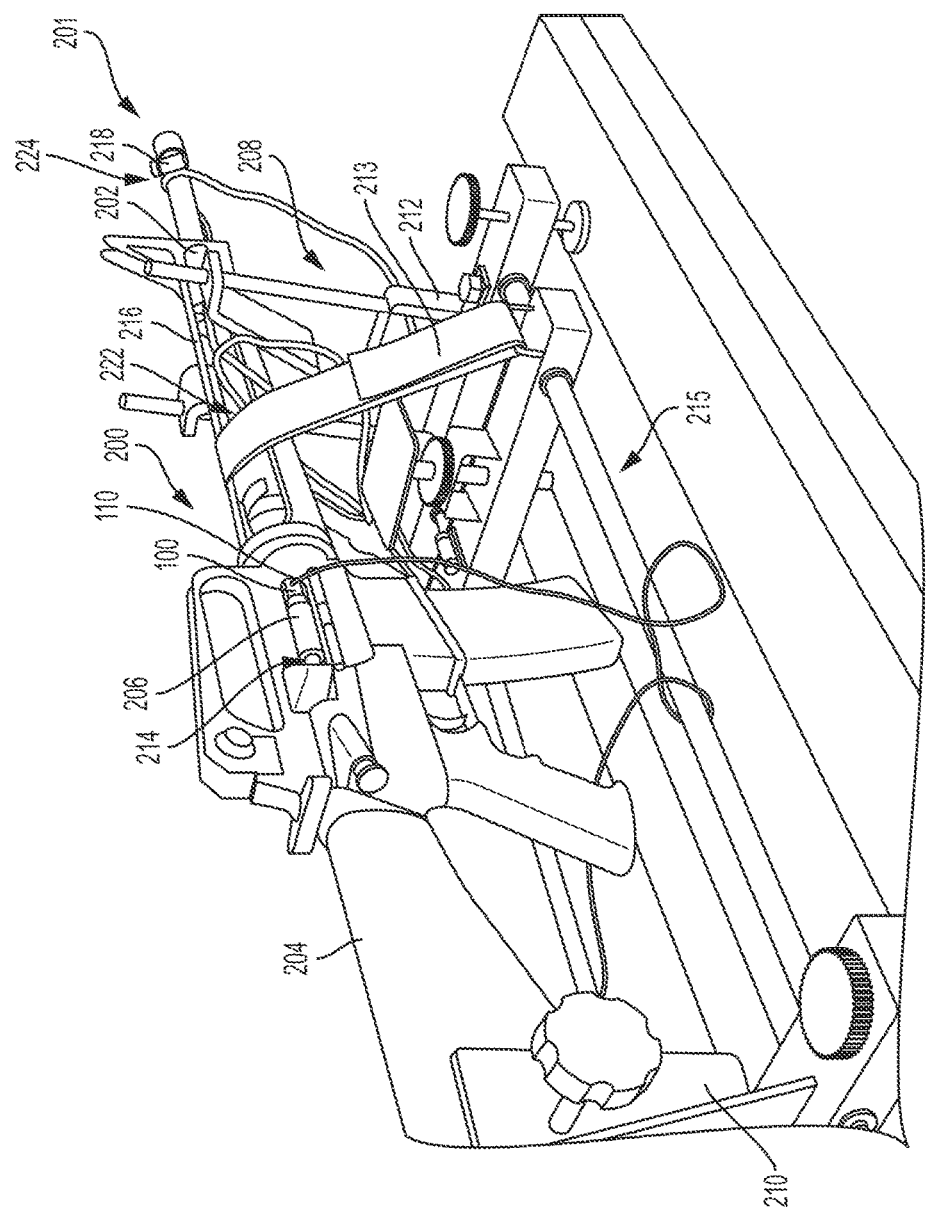
FIG. 4 is a perspective view of an illustrative measurement system including a test fixture supporting a firearm for use with the test ammunition round of FIG. 1.

FIG. 4 shows an illustrative test system 200 including firearm 201 having a barrel 202, a butt 204 and firing chamber 206. As noted above, the firearm 201 may be an M16A2 rifle. The firearm 201 is illustratively coupled to a test stand 208 including a rear or proximal upright 210 supporting the butt 204 of the firearm 201, and a front or distal upright 212 supporting the barrel 202 of the firearm 201. A tie down strap 213 is positioned intermediate the uprights 210 and 212 and engages the barrel 202. A base 215 extends between the uprights 210 and 212, wherein the tie down strap 213 is axially adjustable along rails of the base 215. As is known, the firing chamber 206 receives a bolt 214, and the barrel 202 includes a gas port 216 and a muzzle 218.

Figure 5:
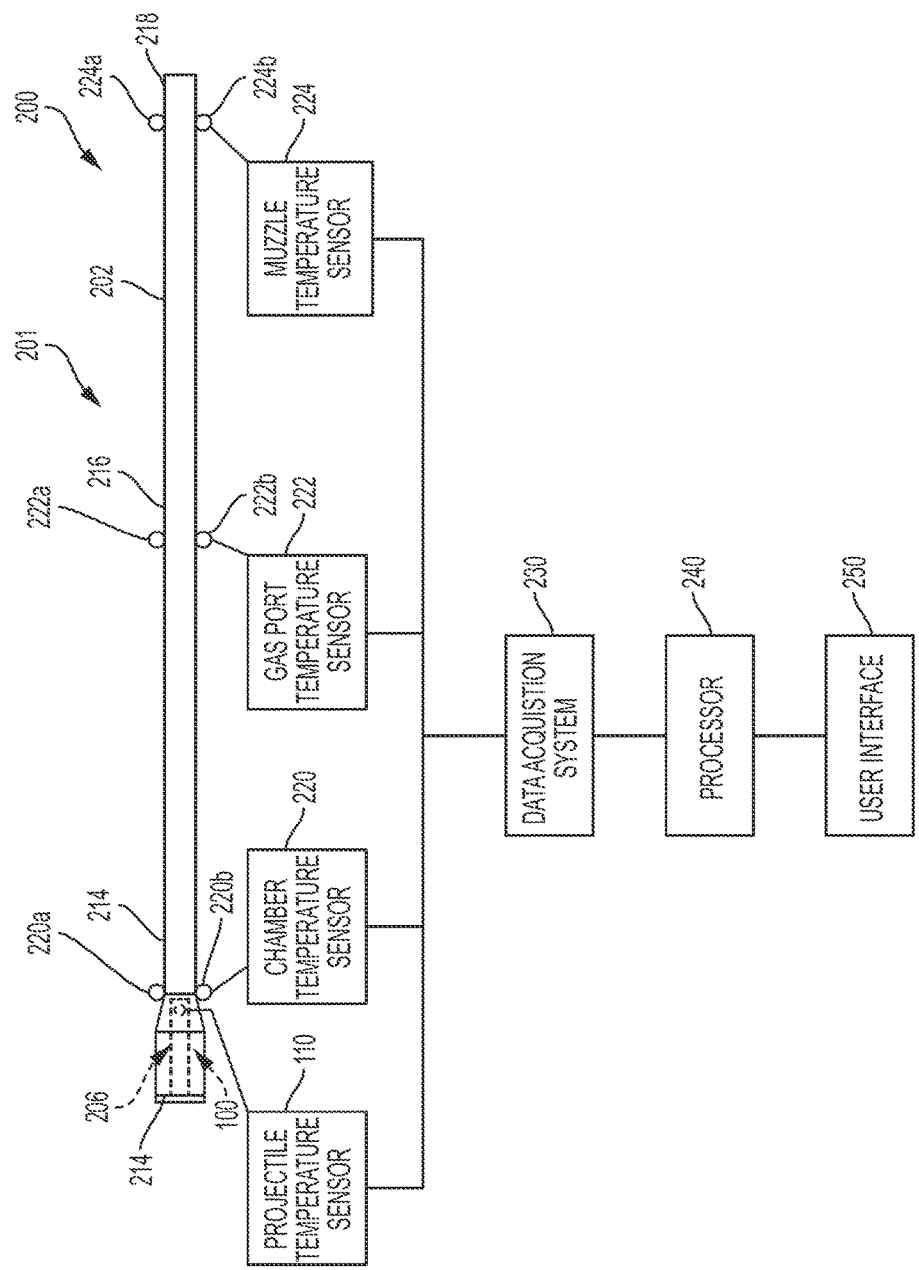
FIG. 5 is a schematic view of the illustrative measurement system of FIG. 4.

FIG. 5 further illustrates the test system 200 as including various temperature sensors, illustratively seven (7) different thermocouples. In addition to the thermocouple 110 of the projectile 102, the illustrative test system 200 includes thermocouples 220a, 220b, 222a, 222b and 224a, 224b operably coupled to the firearm 201. The thermocouples 220a, 220b, 222a, 222b and 224a, 224b are placed at thermally important locations on the barrel 202 to provide additional data on the condition of the barrel 202. More particularly, first and second chamber thermocouples 220a and 220b are thermally coupled to the exterior of the firearm 201 adjacent to the chamber 206, first and second gas port thermocouples 222a and 222b are thermally coupled to the exterior of the firearm 201 adjacent to the gas port 216, and first and second muzzle thermocouples 224a and 224b are thermally coupled to the exterior of the firearm 201 adjacent to the muzzle 218. The thermocouples 110, 220a, 220b, 222a, 222b and 224a, 224b are in electrical communication with data acquisition system 230. The thermocouples 110, 220a, 220b, 222a, 222b and 224a, 224b provide signals indicative of temperature to the data acquisition system 230. While the temperature sensors 220a, 220b, 222a, 222b and 224a, 224b are illustratively contact thermal sensors or thermocouples, it may be appreciated that other devices may be substituted therefor, such as thermal image devices.

A processor 240 is in electrical communication with the data acquisition system 230 and processes information received from the thermocouples 110, 220a, 220b, 222a, 222b and 224a, 224b. Illustratively, the processor 240 averages the values from each group of thermocouples 220a, 220b, 222a, 222b, and 224a, 224b to provide a single temperature measurement at the chamber 206, the gas port 222 and the muzzle 224, respectively. A user interface 250 is in electrical communication with the processor 240 and may provide a graphic representation to a user (FIGS. 10A-10C and 11). For example, the user interface 250 may include a conventional display.

Figure 6:
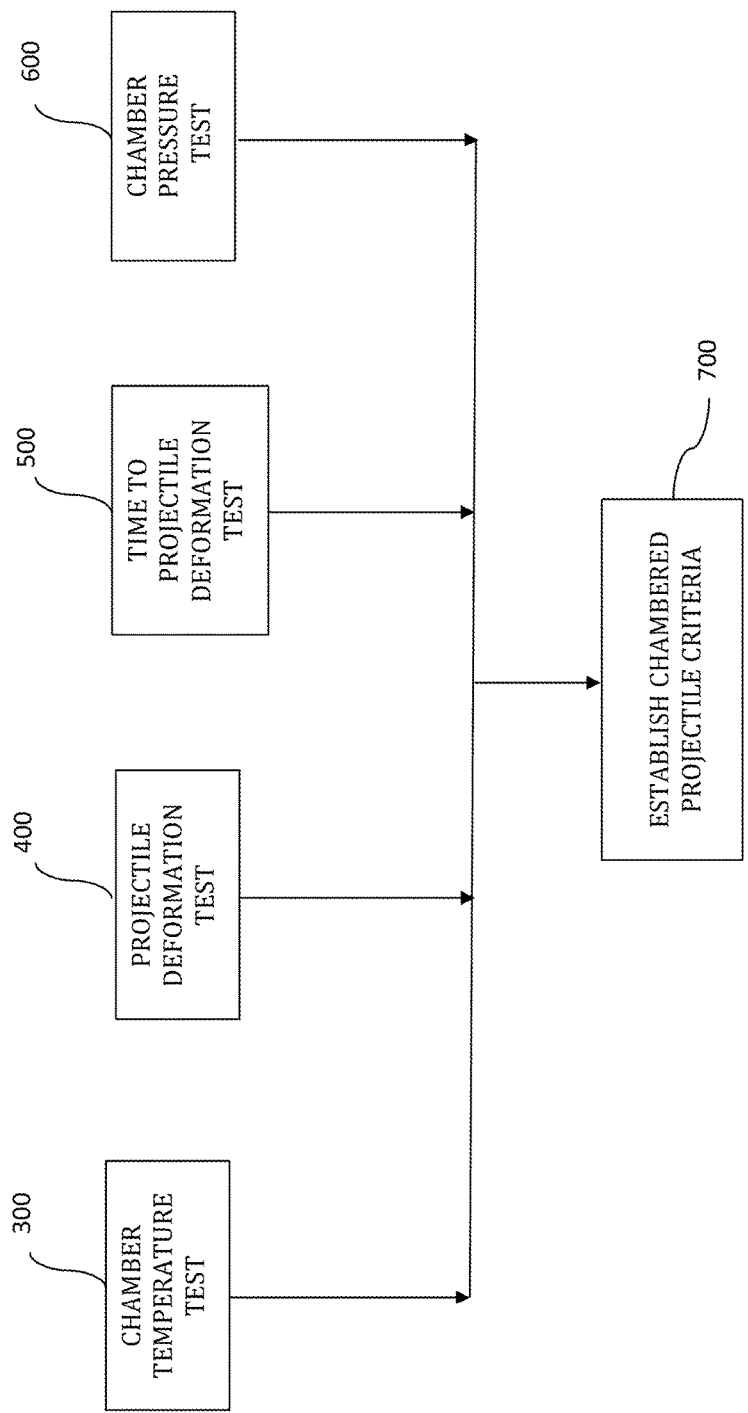
FIG. 6 is a block diagram of illustrative test methods utilizing the test system of FIG. 5, including the test ammunition round.

FIG. 6 illustrates various methods that may be used in combination with the test round of ammunition 100, for example, to establish criteria for operation of the firearm 201 with live rounds of ammunition. As further detailed herein, the chamber temperature test 300 is used to determine temperatures to which a chambered projectile is exposed in a hot firing chamber 206. The projectile deformation test 400 is illustratively used to determine the susceptibility of a projectile to deformation defects from a hot firing chamber 206. The time to projectile deformation test 500 is illustratively used to determine the amount of time to which a projectile can be exposed in a hot firing chamber 206 before a deformation defect occurs. The chamber pressure test 600 is illustratively used to determine the pressure profile and integrity of a deformed projectile when it is fired through a test barrel.

Figure 7A:
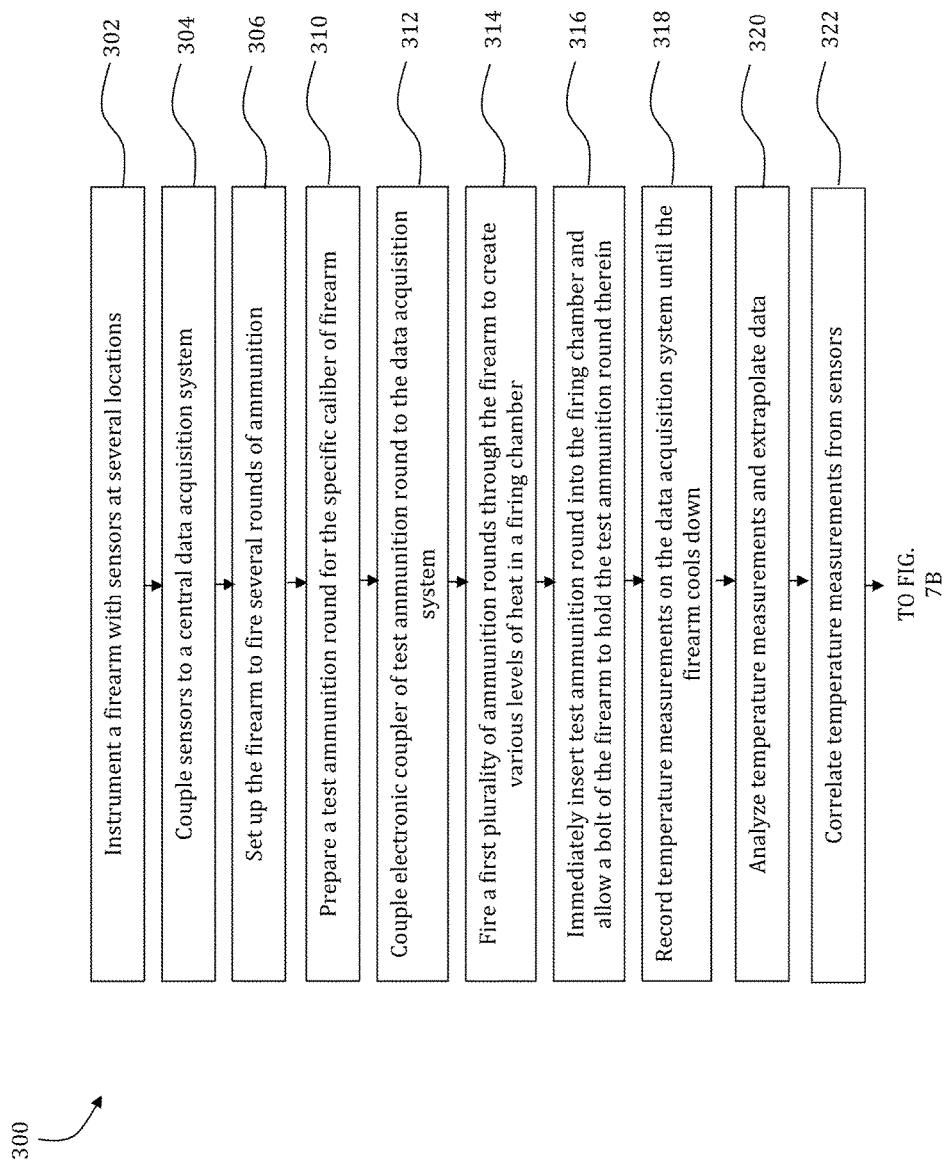
FIG. 7A-7C are flow charts of an illustrative chamber temperature test method of FIG. 6.
Figure 7B:
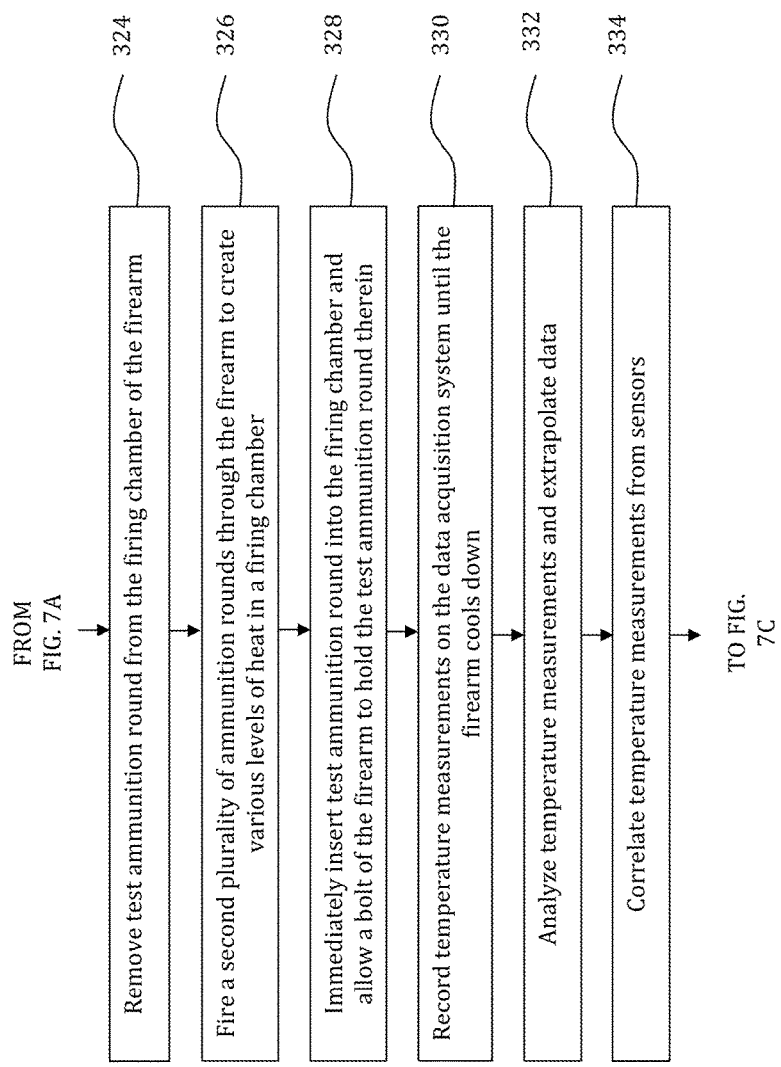
Figure 7C:
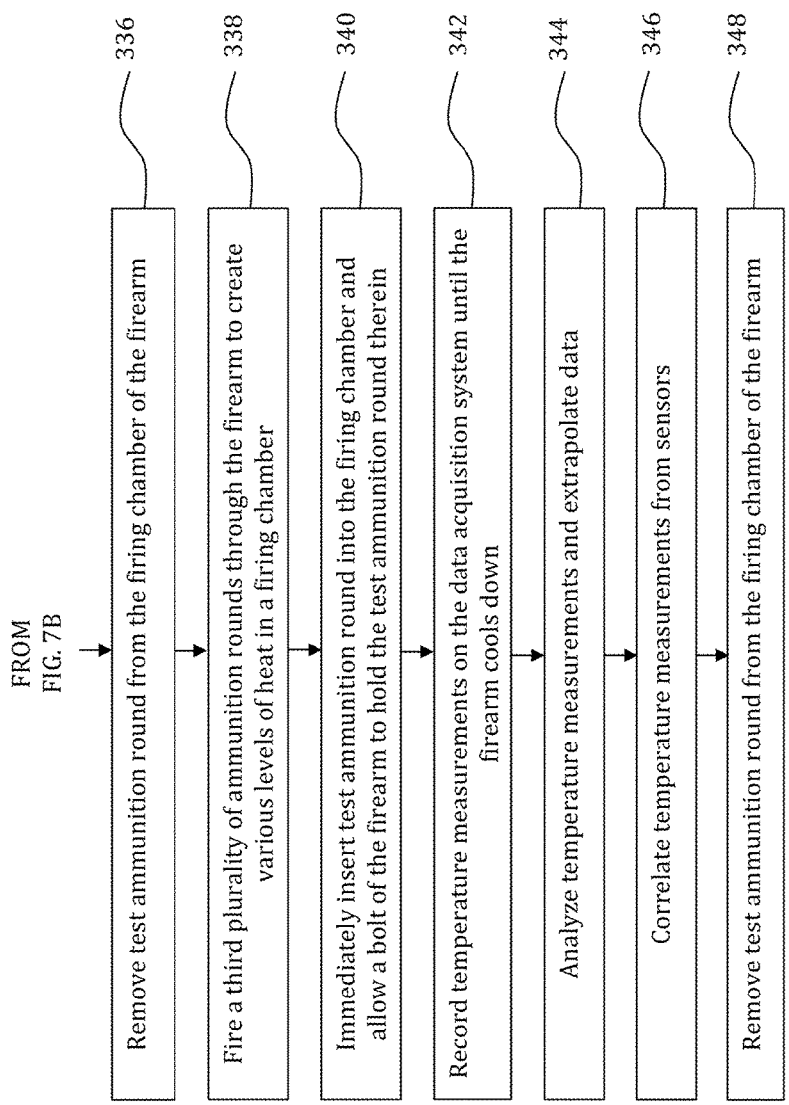

FIGS. 7A-7C represent an illustrative method in which chamber temperature test 300 can be performed using the test round of ammunition 100. At initial step 302, the firearm 201 under test may be instrumented with the plurality of temperature sensors. The plurality of temperature sensors may include thermocouples 220a, 220b, 222a, 222b and 224a, 224b at a plurality of locations along a barrel 202 in the manner detailed above. Further, a pressure sensor may be located within gas port 216 of the firearm 201 to monitor the various pressures produced during a firing sequence. Illustrative step 304 involves electronically coupling the plurality of thermocouples 220a, 220b, 222a, 222b and 224a, 224b to the data acquisition system 230 that may monitor and record the readings produced by the plurality of sensors 220a, 220b, 222a, 222b and 224a, 224b.

In step 306, the firearm 201 may be set up in the test stand 208 to point the muzzle 218 of the barrel 202 towards a target down a firing range. The barrel 202 may be pointed towards a witness panel that may be used to indicate the impact locations of projectiles or bullets fired from the firearm 201. Additionally, a substantial amount of ammunition that corresponds to the firearm 201 may be prepared for successive firing. At step 310, the test round of ammunition 100 is prepared for the specific firearm 201 under test. Step 310 involves preparing the case 104 and the projectile 102 to accommodate thermocouple 110 as further described herein. More specifically, the teachings of this disclosure can be incorporated for the correct caliber of ammunition to the firearm 201 under test. At step 312, the wire 108 of the test round of ammunition 100 can be coupled to the data acquisition system 230. A first plurality of live ammunition rounds may be fired through the firearm 201 in a rapid fire or burst mode at step 314 to heat the firing chamber 206 to a first operating threshold temperature. Illustratively, the first plurality of live ammunition rounds is thirty (30) rounds (e.g., one full magazine) that have been conditioned at 70° F. (+/−10° F.) for at least two hours before firing.

At illustrative step 316, the test round of ammunition 100 is immediately inserted into the chamber 206 after the last of the first plurality of rounds of ammunition has been fired. Further, the bolt 214 of the firearm 201 may partially contact the base portion 208 of the sleeve 106 to hold the test round of ammunition 100 substantially within the chamber 206. While the test round of ammunition 100 is being held in the chamber 206, at step 318 the data acquisition system 230 may measure and record temperature readings from the thermocouple 110 located in the projectile, and from thermocouples 220a, 220b, 222a, 222b and 224a, 224b located on the barrel 202. These temperature measurements are illustratively monitored until the firearm 201 cools down, illustratively until either the temperature of the projectile thermocouple 110, or the average temperature of the barrel thermocouples 220a, 220b, 222a, 222b and 224a, 224b is less than 125° F., whichever occurs later.

In step 320, the data recorded by the data acquisition system 230 may be analyzed and extrapolated by the processor 240 to determine the various temperatures of the projectile 102 and the firearm 201 based on the amount of ammunition that has been fired there through. This data may be presented as graphical representations on display of the user interface 250, such as the temperature profile of FIG. 10A. Additionally, the processor 240 at block 322 may correlate the temperature measurements from different thermocouples 110, 220a, 220b, 222a, 222b and 224a, 224b. The illustrative method 300 continues at step 324 in FIG. 7B, where the test ammunition round 100 is removed from the firing chamber 206.

Next, at step 326 a second plurality of live ammunition rounds may be fired through the firearm 201 in a rapid fire or burst mode to heat the firing chamber 206 to a second threshold temperature. Illustratively, the second plurality of live ammunition rounds is sixty (60) rounds (e.g., two full magazines) that have been conditioned at 70° F. (+/−10° F.) for at least two hours before firing.

At illustrative step 328, the test round of ammunition 100 is immediately inserted into the chamber 206 after the last of the second plurality of rounds of ammunition has been fired. Further, the bolt 214 of the firearm 201 may partially contact the base portion 208 of the sleeve 106 to hold the test round of ammunition 100 substantially within the chamber 206. While the test round of ammunition 100 is being held in the chamber 206, at step 330 the data acquisition system 230 may measure and record temperature readings from the thermocouple 110 located in the projectile, and from thermocouples 220a, 220b, 222a, 222b and 224a, 224b located on the barrel 202. These temperature measurements are illustratively monitored until the firearm 201 cools down, illustratively until either the temperature of the projectile thermocouple 110, or the average temperature of the barrel thermocouples 220a, 220b, 222a, 222b and 224a, 224b is less than 125° F., whichever occurs later. In step 332, the data recorded by the data acquisition system 230 may be analyzed and extrapolated by the processor 240 to determine the various temperatures of the projectile 102 and the firearm 201 based on the amount of ammunition that has been fired there through. This data may be presented as graphical representations on display of the user interface 250, such as the temperature profile of FIG. 10B. Additionally, at block 334 the processor 240 may correlate the temperature measurements from different thermocouples 110, 220a, 220b, 222a, 222b and 224a, 224b. The illustrative method 300 continues at step 336 of FIG. 7C, where the test ammunition round 100 is removed from the firing chamber 206.

At step 338, a third plurality of live ammunition rounds may be fired through the firearm 201 in a rapid fire or burst mode to heat the firing chamber 206 to a third threshold temperature. Illustratively, the third plurality of live ammunition rounds is ninety (90) rounds (e.g., three full magazines) that have been conditioned at 70° F. (+/−10° F.) for at least two hours before firing.

At illustrative step 340, the test round of ammunition 100 is immediately inserted into the chamber 206 after the last of the third plurality of rounds of ammunition has been fired. Further, the bolt 214 of the firearm 201 may partially contact the base portion 208 of the sleeve 106 to hold the test round of ammunition 100 substantially within the chamber 206. While the test round of ammunition 100 is being held in the chamber 206, at step 342 the data acquisition system 230 may measure and record temperature readings from the thermocouple 110 located in the projectile, and from thermocouples 220a, 220b, 222a, 222b and 224a, 224b located on the barrel 202. These temperature measurements are illustratively monitored until the firearm 201 cools down, illustratively until either the temperature of the projectile thermocouple 110, or the average temperature of the barrel thermocouples 220a, 220b, 222a, 222b and 224a, 224b is less than 125° F., whichever occurs later.

In step 344, the data recorded by the data acquisition system 230 may be analyzed and extrapolated by the processor 240 to determine the various temperatures of the projectile 102 and the firearm 201 based on the amount of ammunition that has been fired there through. This data may be presented as graphical representations on display of the user interface 250, such as the temperature profile of FIG. 10C. Additionally, at step 346 the processor 240 may correlate the temperature measurements from different thermocouples 110, 220a, 220b, 222a, 222b and 224a, 224b. The illustrative method 300 continues at step 348, where the test ammunition round 100 is removed from the firing chamber 206.

Figure 11:
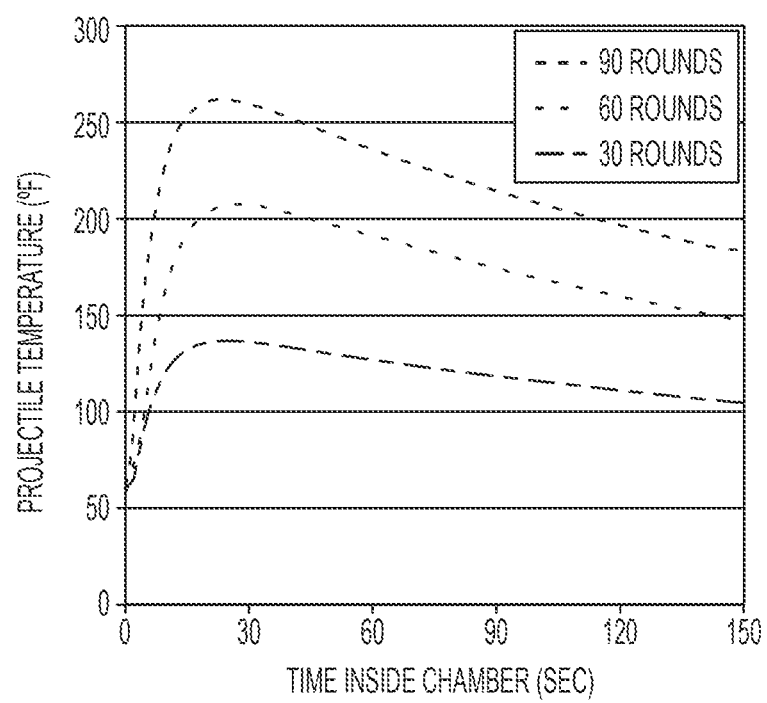
FIG. 11 is a graphical representation of temperature profiles from the projectile thermocouple of FIGS. 10A, 10B and 10C.

As further detailed above, data collected by the exemplary data acquisition system 230 may be used by the processor 240 to determine a temperature profile (e.g., temperature time curve) of a projectile in the chamber 206. The temperature profiles are developed by successively firing a set quantity of live rounds of ammunition through the weapon 201 and then chambering the instrumented projectile 102. After the successive live rounds of ammunition are fired, the test ammunition round 100 is placed within the chamber 206 and temperature measurements are recorded beginning at time zero (0) and ending when either the temperature of the projectile thermocouple 110 or the average of the barrel thermocouples 220a, 220b, 222a, 222b and 224a, 224b are less than 125° F. (51.67° C.), whichever occurs later. FIG. 11 illustrates temperature measurements from the projectile thermocouple 110 for each test scenario (e.g., thirty (30) rounds, sixty (60) rounds and ninety (90) rounds fired) for comparison.

Figure 8:
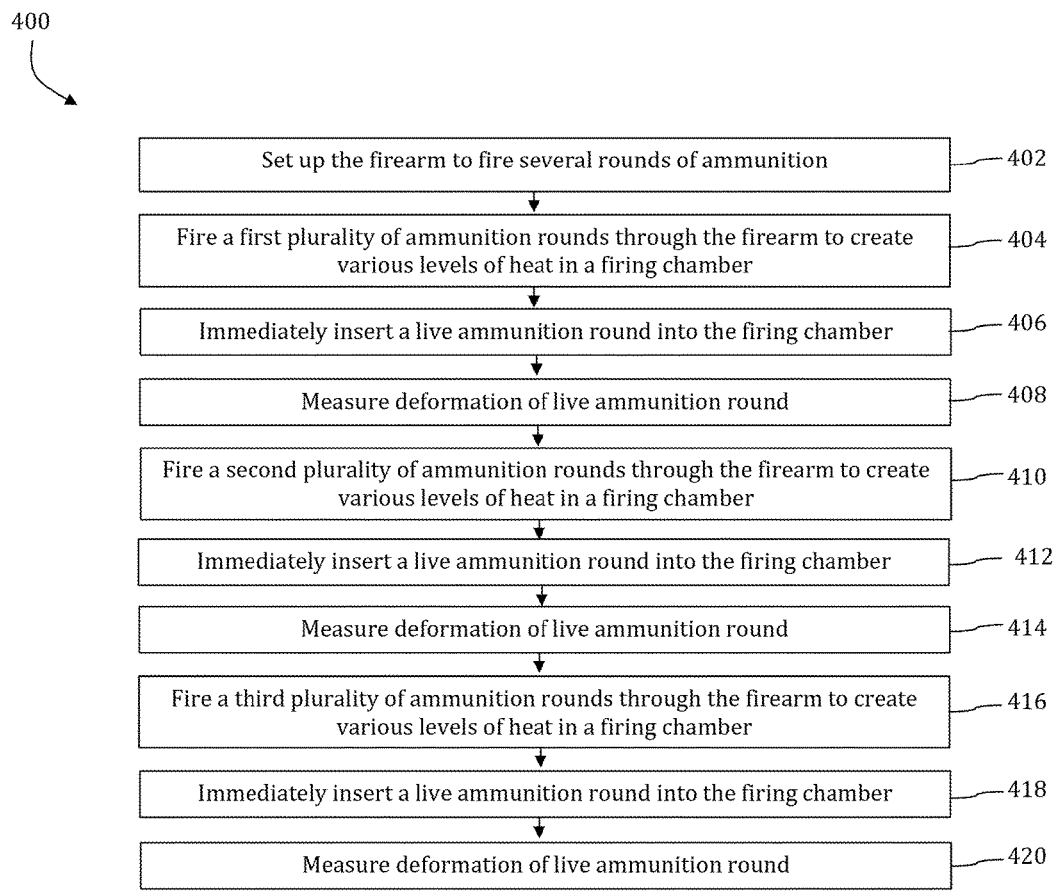
FIG. 8 is a flow chart of an illustrative projectile deformation test of FIG. 6.

FIG. 8 represents additional details of an illustrative method in which the projectile deformation test 400 can be performed. In step 402, the firearm 201 may be set up in the test stand 208 to point the muzzle 218 of the barrel 202 towards a target down a firing range. The barrel 202 may be pointed towards a witness panel that may be used to indicate the impact locations of projectiles fired from the firearm 201. Additionally, a substantial amount of ammunition that corresponds to the firearm 201 may be prepared for successive firing.

At step 404, a first plurality of live ammunition rounds may be fired through the firearm 201 in a rapid fire or burst mode to heat the firing chamber 206 to the first operating threshold temperature. As detailed above, the first plurality of live ammunition rounds is thirty (30) rounds (e.g., one full magazine). Immediately after firing, at step 406 a new live ammunition round is placed within the heated chamber 206 for about 80 seconds. At step 408, the ammunition round is removed from the chamber 206, and changes in the overall length and the projectile diameter are measured.

At step 410, a second plurality of live ammunition rounds may be fired through the firearm 201 to heat the firing chamber 206 to the second operating threshold temperature. As detailed above, the first plurality of live ammunition rounds is sixty (60) rounds (e.g., two full magazines). Immediately after firing, at step 412 a new live ammunition round is placed within the heated chamber 206 for about 80 seconds. At step 414, the ammunition round is removed from the chamber 206, and changes in the overall length (L1) and the projectile diameter are measured.

At step 416, a third plurality of live ammunition rounds may be fired through the firearm 201 in a rapid fire or burst mode to heat the firing chamber 206 to the first operating threshold temperature. As detailed above, the third plurality of live ammunition rounds is ninety (90) rounds (e.g., three full magazines). Immediately after firing, at step 418 a live ammunition round is placed within the heated chamber 206 for about 80 seconds. At step 420, the ammunition round is removed from the chamber 206, and changes in the overall length (L1) and the projectile diameter are measured.

As may be appreciated, by comparing the measured deformations from steps 408, 414 and 420, the number of rounds fired (thirty (30), sixty (60) and ninety (90)) and associated threshold temperatures that cause projectile deformation may be determined. Illustratively, it has been determined that projectile deformation exceeds an allowable value after ninety (90) rounds of ammunition are successively fired in a rapid fire or bust mode. As shown in FIG. 11, this projectile deformation temperature is approximately 250° F.

Figure 9:
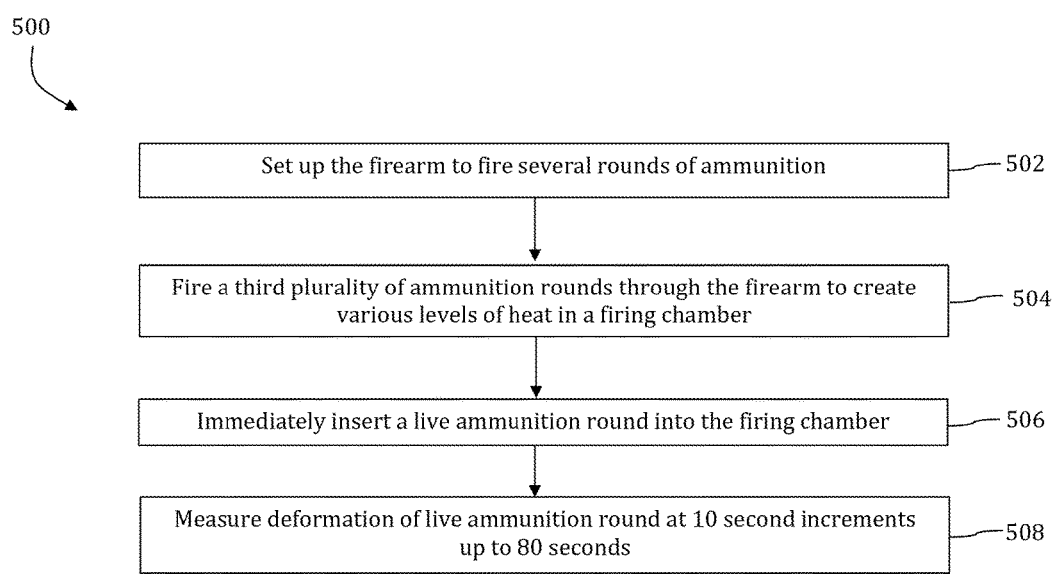
FIG. 9 is a flow chart of an illustrative time to projectile deformation test of FIG. 6.

FIG. 9 represents additional details of an illustrative method in which the time to projectile deformation test 500 can be performed. In step 502, the firearm 201 may be set up in the test stand 208 to point the muzzle 218 of the barrel 202 towards a target down a firing range. The barrel 202 may be pointed towards a witness panel that may be used to indicate the impact locations of projectiles fired from the firearm 201. Additionally, a substantial amount of ammunition that corresponds to the firearm 201 may be prepared for successive firing.

At step 504, the third plurality of live ammunition rounds may be fired through the firearm 201 to heat the firing chamber 206 to the third operating threshold temperature. As detailed above, the third plurality of live ammunition rounds is ninety (90) rounds (e.g., three full magazines). Immediately after firing, at step 506 a new live ammunition round is placed within the heated chamber 206. At step 508, the ammunition round is removed from the chamber 206, and changes in the overall length (L1) and the projectile diameter are measured. This test is repeated with exposure times of the live ammunition round within the chamber 206 ranging from 10 seconds to 80 seconds, in 10 second increments. Illustratively, it was observed that significant projectile deformation was experienced by projectiles in the hot chamber 206 with exposure times of as little as 20 seconds.

The chamber pressure test 600 involves firing from a conventional test barrel at least two ammunition rounds that were deformed due to exposure to a hot firing chamber 206 in a manner similar to those rounds deformed in the projectile deformation test 400 and/or the time to projectile deformation test 500. The deformed ammunition rounds are illustratively fired through a witness panel to verify projectile integrity. Chamber pressure is measured using conventional test equipment to provide information on the effect of firing a deformed projectile. Additionally, the witness panel is inspected and photographed. Finally, the test barrel is inspected for damage. This test indicated that ammunition rounds with deformed projectiles tend to create multiple holes in the witness panel indicating a loss of projectile integrity.

Figure 10A:
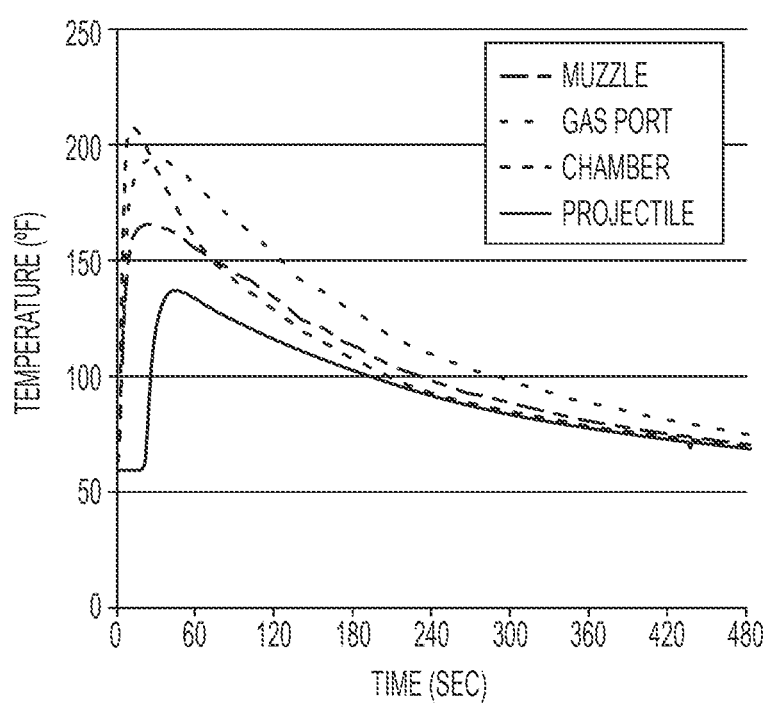
FIG. 10A is a graphical representation of temperature profiles from thermocouples of the test system of FIG. 5, following firing a first plurality of rounds of ammunition through the firearm under test.
Figure 10B:
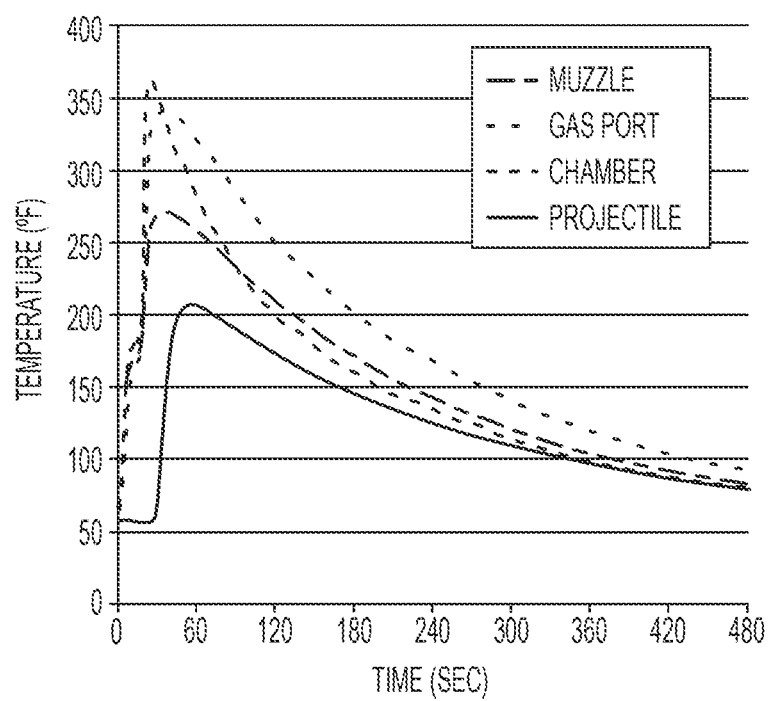
FIG. 10B is a graphical representation of temperature profiles from thermocouples of the test system of FIG. 5, following firing a second plurality of rounds of ammunition through the firearm under test.
Figure 10C:
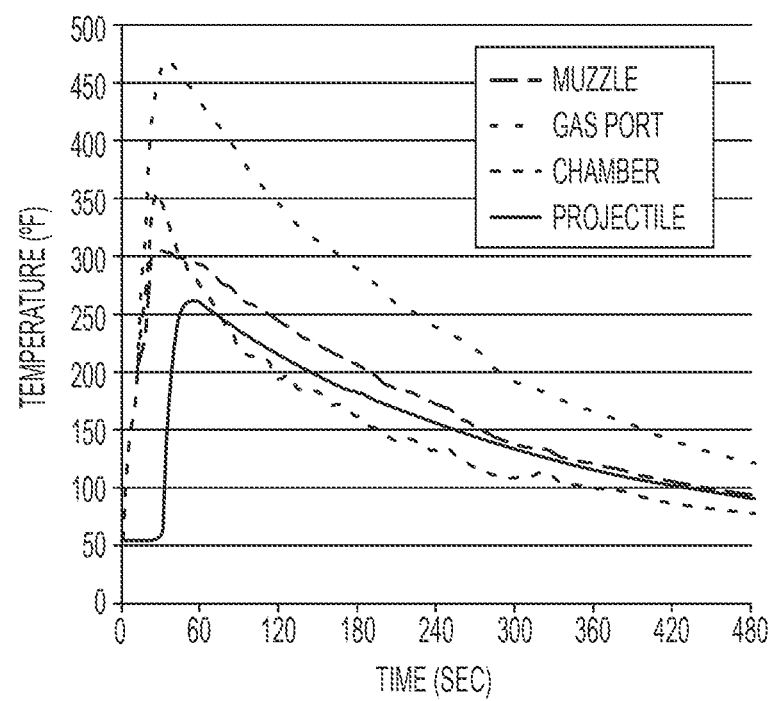
FIG. 10C is a graphical representation of temperature profiles from thermocouples of the test system of FIG. 5, following firing a third plurality of rounds of ammunition through the firearm under test.

FIG. 10A illustrates the temperature profiles for thermocouples 220, 222 and 224 after firing thirty (30) successive rounds of ammunition in a rapid fire or burst mode. FIG. 10B illustrates the temperature profiles for thermocouples 110, 220, 222 and 224 after firing sixty (60) successive rounds of ammunition in a rapid fire or burst mode. FIG. 10C illustrates the temperature profiles for thermocouples 110, 220, 222 and 224 after firing ninety (90) successive rounds of ammunition in a rapid fire or burst mode. By analyzing the temperature profiles of the thermocouples 110, 220, 222 and 224, the processor 240 may establish relationships between the projectile thermocouple 110 and the barrel thermocouples 220a, 220b, 222a, 222b and 224a, 224b. As such, temperature measurements from the barrel thermocouples 220a, 220b, 222a, 222b and 224a, 224b may be used to predict temperature measurements from the projectile thermocouple 110.

As detailed above, the projectile deformation test was used to determine whether ammunition rounds were likely to deform when exposed to high chamber temperatures of the firearm 201. The chamber 206 was heated by firing successive rounds of ammunition to generate the temperature profiles of FIGS. 10A, 10B and 10C. More particularly, after firing thirty (30) successive rounds of ammunition in a rapid fire or burst mode, a round was placed within the heated chamber 206 (temperature profile FIG. 10A). Deformation, if any, of the projectile was then measured at 10 second increments up to a total duration time of 80 seconds. Next, after firing sixty (60) successive rounds of ammunition in a rapid fire or burst mode, a round was placed within the heated chamber 206 (temperature profile FIG. 10B). Deformation, if any, of the projectile was then measured at 10 second increments up to a total duration time of 80 seconds. Finally, after firing ninety (90) successive rounds of ammunition in a rapid fire or burst mode, a round was placed within the heated chamber 206 (temperature profile FIG. 10C). Deformation, if any, of the projectile was then measured at 10 second increments up to a total duration time of 80 seconds. A composite of temperature measurements from the projectile thermocouple 110 from FIGS. 10A, 10B and 10C is illustrated in FIG. 11.

During deformation testing, it was observed that the temperature profiles of FIGS. 10A and 10B (thirty (30) successive rounds fired and sixty (60) successive rounds fired, respectively) did not cause deformation of a projectile of a round received within the firearm chamber 206. However, it was also observed that the temperature profiles of FIG. 10C (ninety (90) successive rounds fired) were likely to cause deformation of a round received within the firearm chamber 206 for at least 20 seconds. In other words, it was predicted that successive rapid firing of ninety (90) rounds of ammunition was likely to cause the temperature of the firing chamber 206 to exceed the projectile deformation temperature of 250° F. As such, operating specifications could be drafted to require that rounds of ammunition not be held for more than 20 seconds in a heated firing chamber 206 having a projectile deformation temperature at least 250° F. (as caused by that successive rapid firing of ninety (90) rounds of ammunition).

Further, a maximum chamber temperature can be determined by utilizing the test round of ammunition 100. Various amounts of ammunition could be fired through firearm 201 until a maximum temperature is consistently read by the test round of ammunition 100. For example, taking a temperature reading with the test round of ammunition 100 after firing ninety (90) rounds of ammunition may yield the same chamber temperature reading as after firing one-hundred and eighty rounds of ammunition. Once the maximum chamber temperature for a specific firearm 201 is known, ammunition manufacturers may utilize this information to design a projectile that has sufficient material properties to avoid substantial deformation when exposed to such maximum chamber temperatures.

Although the invention has been described in detail with reference to certain preferred embodiments, variations and modifications exist within the spirit and scope of the invention as described and defined in the following claims.

The invention claimed is:

1. A method of manufacturing a test ammunition round, the method comprising the steps of:
   providing a projectile that is compatible with a firing chamber for a firearm under test;
   boring a receiving cavity in a proximal end of the projectile;
   providing a case that is compatible with the chamber of the firearm under test, the case including a case passageway extending from a proximal end to a distal end;
   boring a case opening into in the proximal end of the case;
   providing a thermocouple and a lead wire electrically coupled to the thermocouple;
   one of brazing and soldering the thermocouple into the receiving cavity of the projectile;
   running the lead wire from the thermocouple, and through the case passageway of the case;
   pressing the proximal end of the projectile into the distal end of the case;
   providing a sleeve including a cylindrical outer side wall defining an axially extending sleeve passageway;
   forming a radially extending slot within the proximal end of the sleeve;
   running the lead wire axially into the sleeve passageway and radially out through the slot in the sleeve; and
   pressing the distal end of the sleeve at least partially into the proximal end of the case.

2. The method of claim 1, wherein the step of boring the receiving cavity includes drilling into a solid copper projectile.

3. The method of claim 1, wherein the step of one of brazing and soldering includes using silver solder to secure the thermocouple within the receiving cavity.

4. The method of claim 1, wherein the step of boring the case opening includes drilling the proximal end of the case.

5. The method of claim 4, wherein the step of pressing the distal end of the sleeve includes press fitting a ⅜ inch tube into the proximal end of the case.

6. The method of claim 1, wherein the step of pressing the proximal end of the projectile includes using a reloading press to crimp the distal end of the case to the proximal end of the projectile.

7. The method of claim 1, wherein the case has a maximum outer diameter less than 10 millimeters.

8. The method of claim 7, wherein the combined length of the case and the projectile is less than 60 millimeters.

9. The method of claim 8, wherein the case and the projectile include dimensions of a standard 5.56 mm ammunition round.

10. A method of measuring the temperature of a chambered projectile in a firearm using a test ammunition round, the method comprising the steps of:
    providing a firearm including a firing chamber;
    instrumenting a test ammunition round projectile with a projectile thermocouple;
    coupling the projectile thermocouple to a data acquisition system, wherein said data acquisition system is external to the firearm;
    firing a first plurality of rounds of ammunition through the firearm under test to heat the firing chamber;
    inserting the test ammunition round into the firing chamber;
    recording a first temperature profile of the projectile through the projectile thermocouple with the data acquisition system;
    removing the test ammunition round from the firing chamber;
    firing a second plurality of rounds of ammunition through the firearm under test to heat the firing chamber, the second plurality of rounds of ammunition being greater than the first plurality of rounds of ammunition;
    inserting the test ammunition round into the firing chamber; and
    recording a second temperature profile of the projectile through the projectile thermocouple with the data acquisition system.

11. The method of claim 10, further comprising the step of comparing the first temperature profile and the second temperature profile to known deformation temperature of the ammunition round to predict a maximum number of successive rounds of ammunition that may be fired before reaching the deformation temperature.

12. The method of claim 10, further comprising the steps of instrumenting the firearm with a plurality of thermocouples, and coupling the plurality of thermocouples to the data acquisition system.

13. The method of claim 12, wherein the step of instrumenting the firearm includes thermally coupling a muzzle thermocouple to a barrel muzzle of the firearm, thermally coupling a gas port thermocouple to a barrel muzzle of the firearm, and thermally coupling a chamber thermocouple to the chamber of the firearm.

14. The method of claim 10, wherein the step of instrumenting a test ammunition round projectile with a projectile thermocouple includes the steps of:
    providing the projectile that is compatible with the firing chamber for the firearm;
    boring a receiving cavity in a proximal end of the projectile;
    providing a case that is compatible with the chamber of the firearm under test, the case including a case passageway extending from a proximal end to a distal end;
    boring a case opening into in the proximal end of the case;
    providing a thermocouple and a lead wire electrically coupled to the thermocouple;
    one of brazing and soldering the thermocouple into the receiving cavity of the projectile;
    running the lead wire from the thermocouple, through the case passageway of the case;
    pressing the proximal end of the projectile into the distal end of the case;
    providing a sleeve including a cylindrical outer side wall defining an axially extending sleeve passageway;
    forming an axially extending slot within the proximal end of the sleeve;
    running the lead wire axially into the sleeve passageway and radially out through the slot in the sleeve; and
    pressing the distal end of the sleeve at least partially into the proximal end of the case.

15. The method of claim 14, wherein the case has a maximum outer diameter less than 10 millimeters.

16. The method of claim 15, wherein the combined length of the case and the projectile is less than 60 millimeters.

17. The method of claim 16, wherein the case and the projectile include dimensions of a standard 5.56 mm ammunition round.

* * * * *